United States Patent
Chung

[11] Patent Number: 5,248,230
[45] Date of Patent: Sep. 28, 1993

[54] DEVICE FOR TAPPING WITHIN DIE

[76] Inventor: Ming-Chin Chung, No. 13-1, Lin 29, JuiTang Li, Yangmei Town, Taoyuan Hsien, Taiwan

[21] Appl. No.: 935,278

[22] Filed: Aug. 26, 1992

[51] Int. Cl.$^5$ ............................................. B23B 47/24
[52] U.S. Cl. .................................... 408/138; 470/96; 74/89.17
[58] Field of Search ............... 74/89.11, 89.13, 89.15, 74/424.88, 417; 408/6, 14, 15, 137, 138, 124, 129; 470/96

[56] References Cited

U.S. PATENT DOCUMENTS

| | | | |
|---|---|---|---|
| 4,453,868 | 6/1984 | Winslow | 408/138 |
| 4,820,087 | 4/1989 | Ikemoto et al. | 408/138 X |
| 5,173,015 | 12/1992 | Maynard | 408/138 X |

*Primary Examiner*—Allan D. Herrmann
*Assistant Examiner*—William O. Trousdell
*Attorney, Agent, or Firm*—Bacon & Thomas

[57] ABSTRACT

A device for tapping within die comprising a power guide means, a transmission means and a tapping means in which the power guide means can transmit power from horizontal displacement of a rack via a gear train in the transmission means to drive a rotating spiral gear to rotate and consequently cause a tapping unit in the tapping means to rotate and displace axially upon action of a guide spiral sleeve and a resistance element, and to tap by overcoming frictional resistance of the resistance element that permits the guide spiral sleeve to rotate freely so that pitch can be adjusted automatically for tapping in different pitches.

5 Claims, 8 Drawing Sheets

DEVICE FOR TAPPING WITHIN DIE

BACKGROUND OF THE INVENTION

The present invention is a combination of and an application of the inventor's invention in U.S. Pat. No. 5,099,708 - Adjustable Rolling Cam Slider, particularly a device for tapping within die which applies a horizontal force from the adjustable rolling cam slider to tap working piece.

The present invention is applicable to tapping within any die, particularly for tapping of small working piece within die, such as tapping metal working piece in punching die.

SUMMARY OF THE INVENTION

A device for tapping within die, particularly tapping of working piece with a round hole, comprising a power guide means, a transmission means and a tapping means in which the power guide means can transmit power from horizontal displacement of a rack via a gear train in the transmission means to drive a rotating spiral gear to rotate and consequently cause a tapping unit in the tapping means to rotate and displace axially upon action of a guide spiral sleeve and a resistance element, and to tap by overcoming frictional resistance of the resistance element that permits the guide spiral sleeve to rotate freely so that pitch can be adjusted automatically for tapping in different pitches.

DETAILED DESCRIPTION OF THE PREFERRED EMBODIMENT

Figure 1:
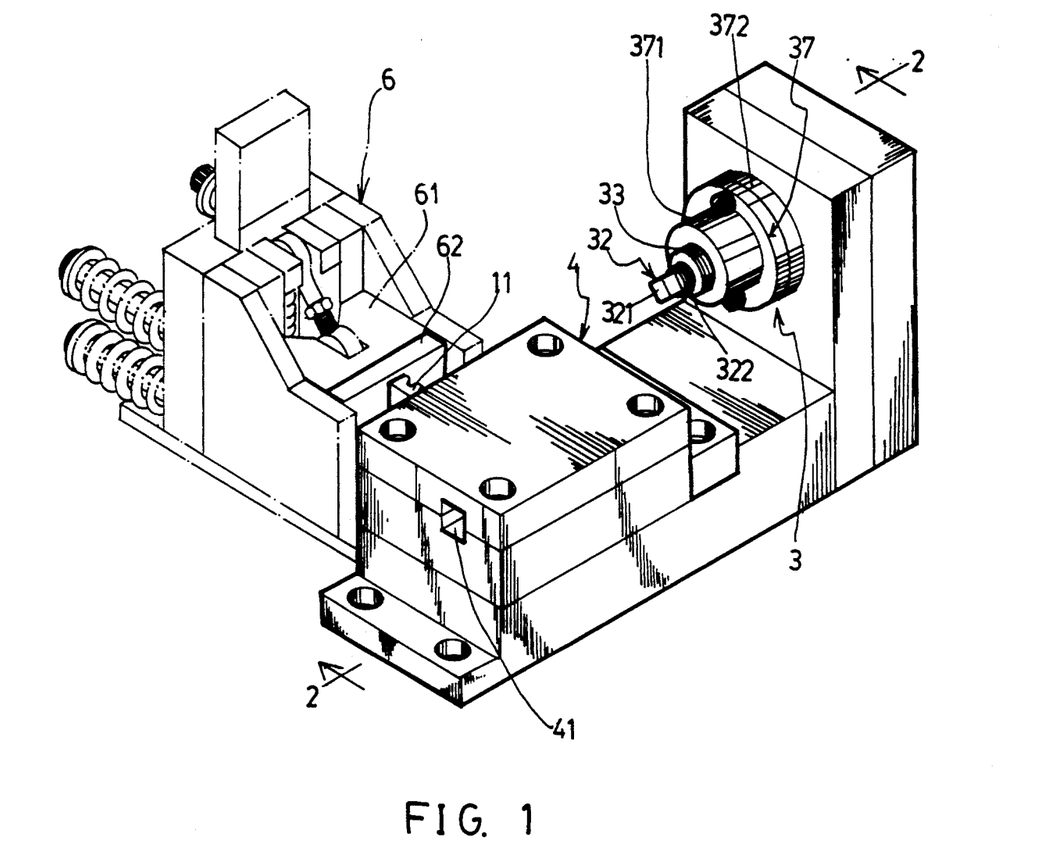
FIG. 1 is a perspective view of the first embodiment of the present invention.
Figure 2:
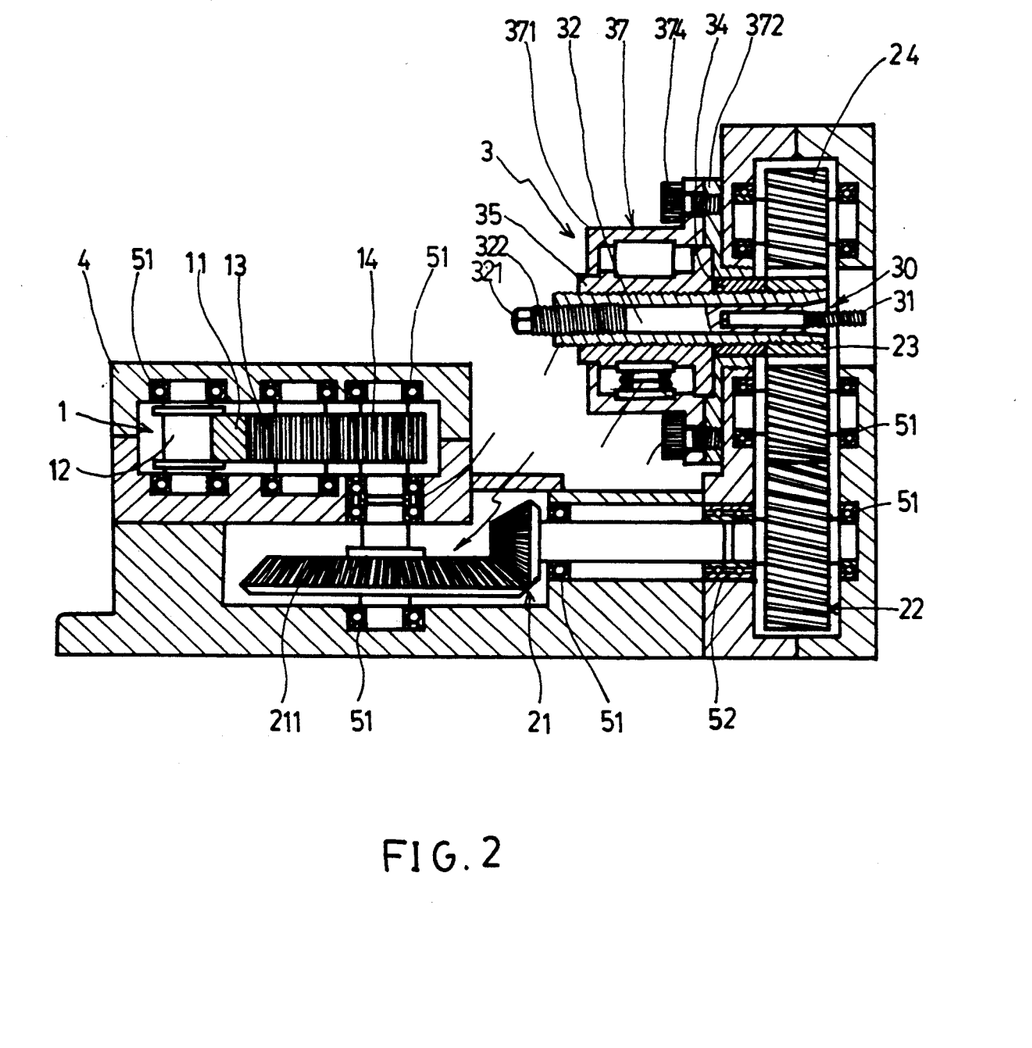
FIG. 2 is a cross-sectional view taken along line 2—2 of FIG. 1 looking in the direction of the arrows.

Please refer to FIGS. 1 and 2, the present invention comprises mainly three units: a power guide means (1), a transmission means (2), and a tapping means (3). The power guide means (1) is an application of the U.S. Pat. No. 5,099,708, an adjustable rolling cam slider (6) with a connection block (62) connected to the outer side of its horizontal sliding block (61) and a rack (11) engaged with the connection block (62).

Figure 3:
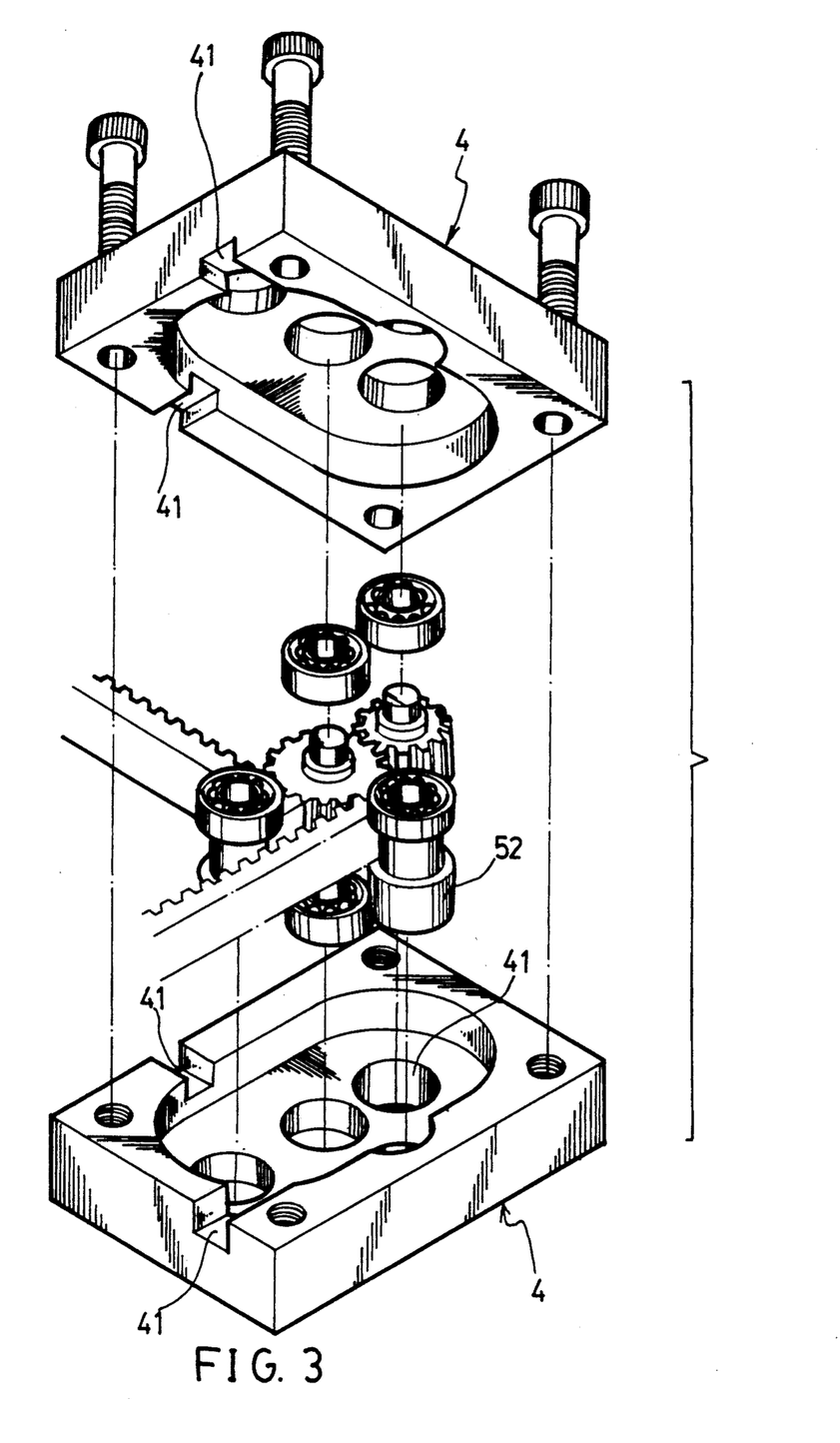
FIG. 3 is a developed view of the power guide means in the embodiment shown in FIG. 1.

Please refer to FIGS. 2 and 3, the power guide means (1) comprises, in addition to the rack (11) mentioned above, a casing (4), two rack guide wheels (12), a driven wheel (13) driven by the rack (11), and an output wheel (14). The rack guide wheels (12) and the driven wheel (13) have each end of their shaft connected to the casing (4) by means of a single-row ball bearing (51) at the upper end and a two-row ball bearing (52) at the lower end. The two-row ball bearing (52) is fixed to a passing hole (42) at the casing (4).

The a rack (11) is located between the rack guide wheels (12) and the driven wheel (13) to drive the driven wheel (13) to rotate for an appropriate interval. A rack inlet (41) is designed at a corresponding position on the casing (4). In the embodiment described herein, the power guide means (1) has two rack inlets (41) designed perpendicular to each other for use selectively so that the position for installation of the present invention is selectable to adapt with need of space in different dies. Upon sliding of the horizontal sliding block (61), the rack (11) is displaced inward for a set distance, and then displaced outward to its original position. When the rack (11) is displaced, the driven wheel (13) is driven to rotate, and consequently the output wheel (14) engaged with the driven wheel (13) is rotated.

Figure 4:
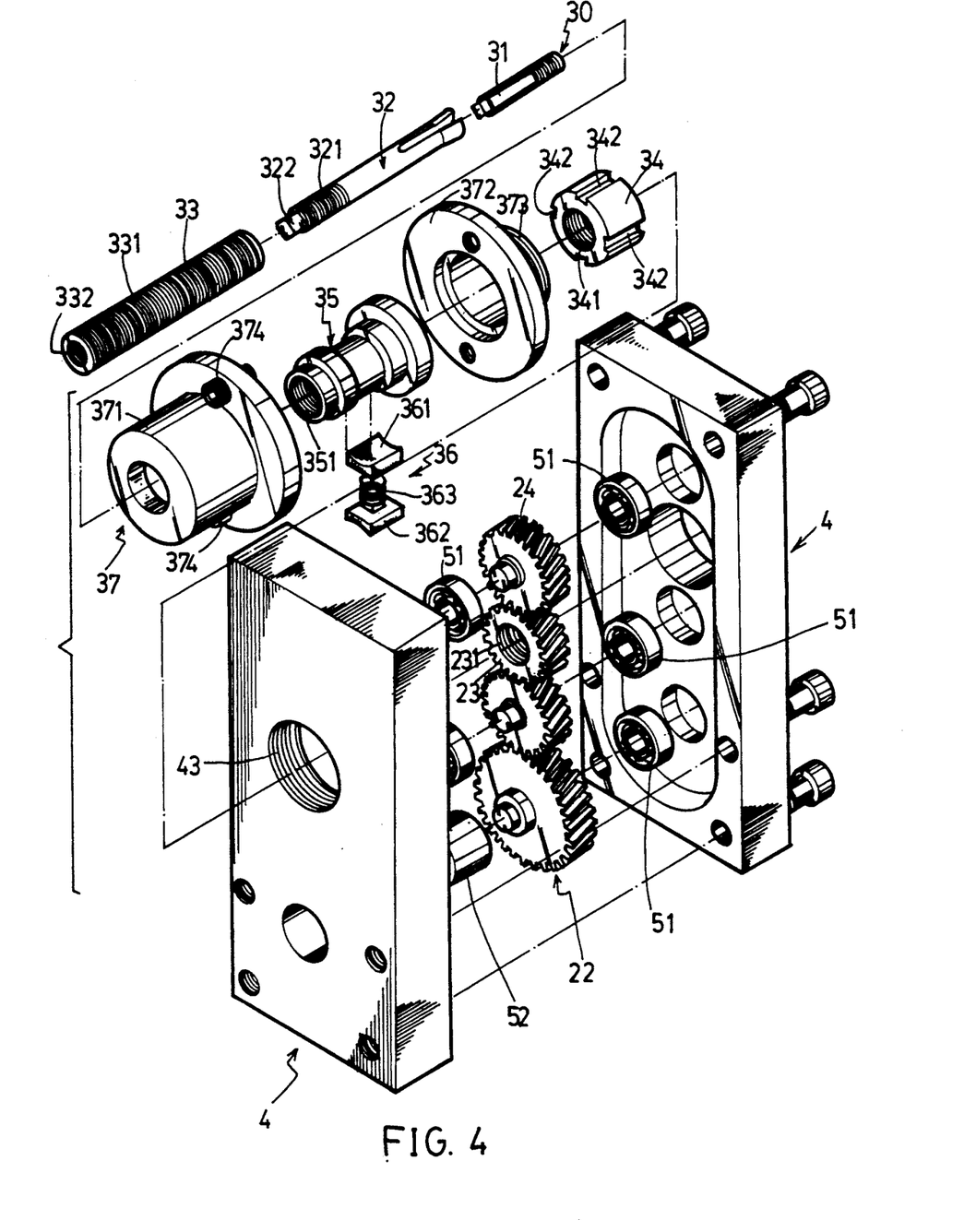
FIG. 4 is a developed view of the tapping means and a part of the transmission means in the embodiment shown in FIG. 1.

As shown in FIGS. 2 and 4, the transmission means (2) according to the present invention includes a first bevel gear train (21), a second spiral gear train (22), and a rotating spiral gear (23) with inner threaded hole (231). The first bevel gear train (21) has a front gear (211) with its upper shaft connected to the two-row ball bearing (52) beneath the output wheel (14) s that it can rotate following the rotation of the output wheel (14). The two-row ball bearing (52) is also used for transmission between the first bevel gear train (21) and the second spiral gear train (22). The second spiral gear train (22) is perpendicularly engaged so that the shaft of the rotating spiral gear (23) is placed horizontally. The first bevel gear train (21) and the second spiral gear train (22) have both ends of their shafts connected to the two-row ball bearing (52) or single-row ball bearing (51) to facilitate their rotation. The rotating spiral gear (23) has a positioning wheel (24) on the top to support and position the rotating spiral gear (23).

By forward and backward displacement of the said rack (11), the rotating spiral gear (23) is driven for rotation via the driven wheel (13), the output wheel (14), the first bevel gear train (21), and the second spiral gear train (22).

Figure 5:
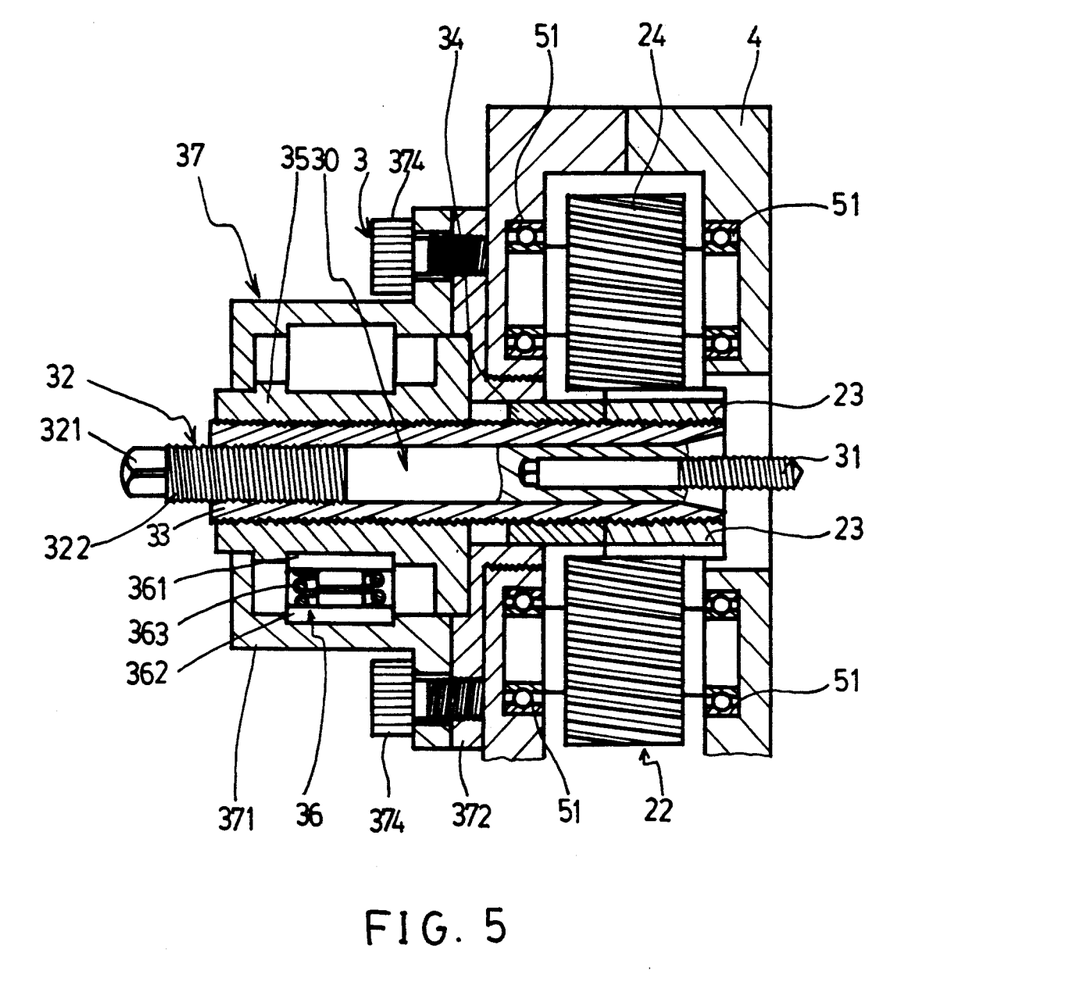
FIG. 5 is a sectional view illustrating operation of the tapping means according to the present invention.

Please refer to FIGS. 2, 4 and 5, the tapping means (3) comprises a tapping unit (30), a guide spiral sleeve (35), a positioning sleeve (37), and a resistance element (36). The tapping unit (30) comprises a tapping drill (31), a tapping chuck (32), a guide spiral element (33), and a fixing nut (34). The guide spiral element (33) has outer thread (331) on its outer circumference and a threaded hole (332) along its axis. The tapping chuck (32) has an outer thread (321) and a square head (322) at an end. The fixing nut (34) has an inner threaded hole (341) and a plurality of slots (342) to ease turning with appropriate tool. The outer thread (321) on the tapping chuck (32) is corresponding to the inner thread of the threaded hole (332) at the guide spiral element (33). The square head (322) of the tapping chuck (32) can be rotated with an appropriate tool to tighten or remove the tapping drill (32) during replacement. The outer thread (331) on the guide spiral element (33) is for engaging with the threaded hole (341) of the fixing nut (34) and the threaded hole (231) of the rotating spiral gear (23). The fixing nut (34) is for fitting the guide spiral element (33) to the rotating spiral gear (23) so that the guide spiral element (33), the tapping drill (31), the tapping chuck (32) and the fixing nut (34) can rotate upon rotation of the rotating spiral gear (23).

The positioning sleeve (37) is for holding of the guide spiral sleeve (35) and the resistance element (36). The positioning sleeve (37) comprises a body (371) and a base (372) fixed together by means of bolts (374). The base (372) has a threaded portion (373) for engaging with the threaded hole (43) of the casing (4).

The guide spiral sleeve (35) has a threaded hole (351) for engaging with the guide spiral element (33). The resistance element (36) is located between the positioning sleeve (37) and the guide spiral sleeve (35). The resistance element (36) comprises two frictional blocks (361 and 362), and a spring (363). The spring (363) is to cause the frictional block (361) to provide a considerable frictional resistance to the guide spiral sleeve (35).

As shown in FIGS. 2 and 5, when the rack (11) is displaced inward and a force is transmitted to the rotating spiral gear (23) via the power guide means (1) and the transmission means (2), the guide spiral element (33) is rotated in the guide spiral sleeve (35). Before starting of each tapping stroke, i.e., when the tapping drill (31) is displaced axially and has not reached the working piece's round hole, the action of the resistance element (36) causes the guide spiral element (33) to displace rapidly axially along the threaded hole (351) of the guide spiral sleeve (35). When the tapping drill (31) reaches the working piece's round hole for tapping, the tapping drill (31) is guided inward by its thread for tapping automatically, while the guide spiral sleeve (35) does not have any effect, the frictional resistance from the resistance element (36) is overcome, i.e., the guide spiral sleeve (35) can be rotated to adjust to a pitch consistent with the tapping drill (31) so that any tapping drill of any pitch can be used in the present invention After completion of the tapping process, the rotating spiral gear (23) and the guide spiral element (33) is rotated reversely due to backward displacement of the rack (11), and then the tapping unit (30) resumes its original position axially in the reserve order of the aforesaid procedure.

Figure 6:
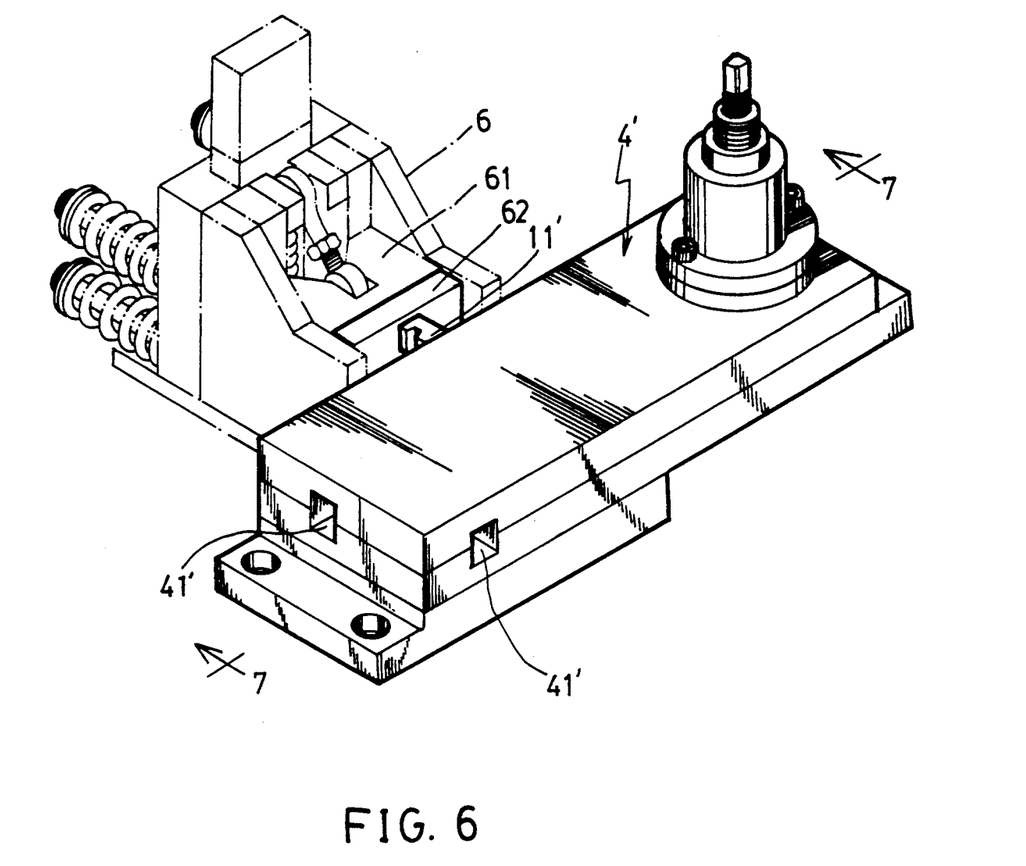
FIG. 6 is a perspective view of another embodiment of the present invention.
Figure 7:
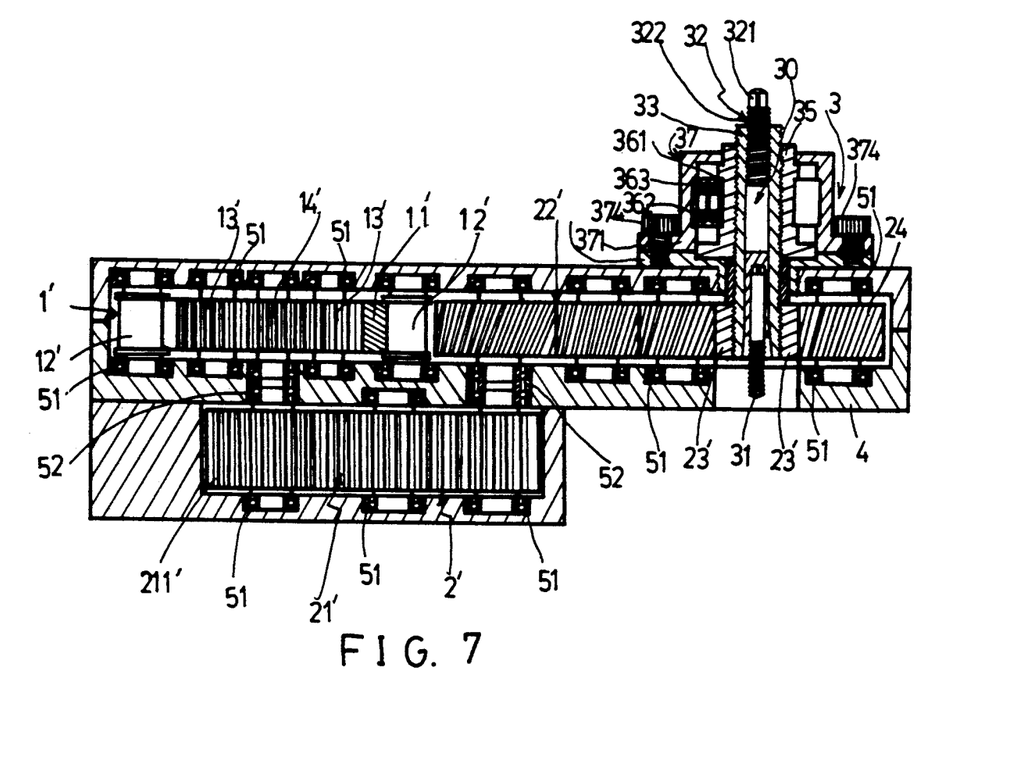
FIG. 7 is a cross-sectional view taken along line 7—7 of FIG. 6 looking in the direction of the arrows.
Figure 8:
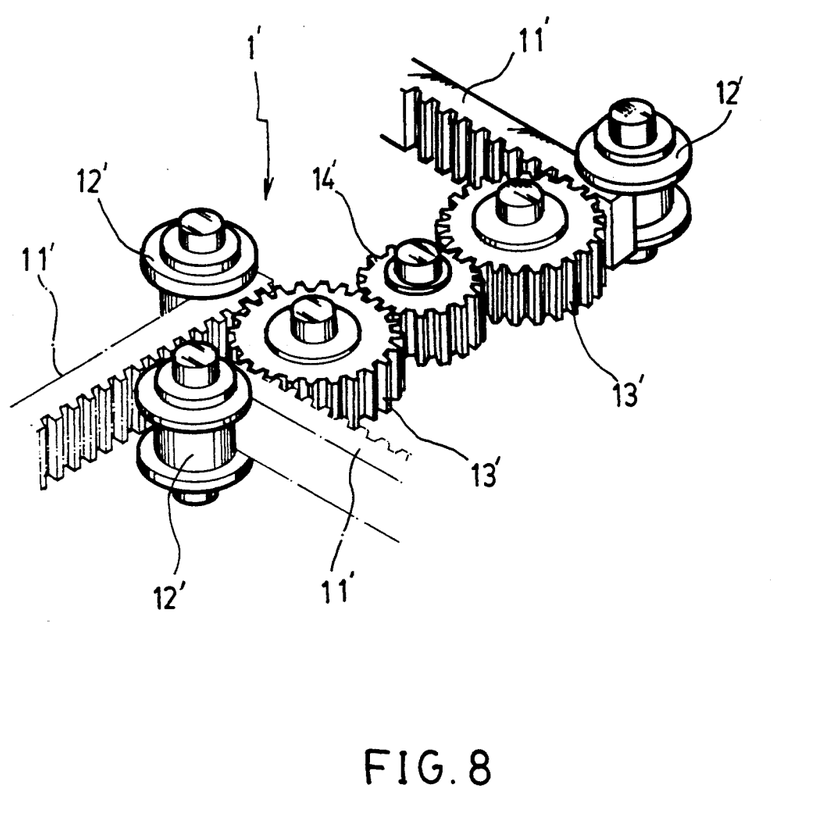
FIG. 8 is a developed view of the power guide means in the embodiment shown in FIG. 6.

Please refer to FIGS. 6, 7, and 8 for another embodiment of the present invention. It is different from that shown in FIGS. 1 through 4 in a design of the power guide means (1') which has three rack inlets (41') and other additional components in its structure, and a design of a tapping means (3) with a vertical tapping unit (30) which consequently altered the structure of the transmission means (2').

As shown in FIGS. 7 and 8, the power guide means (1') has a rack (11'), two driven wheels (13'), three rack guide wheels (12') and an output wheel (14'). The casing (4') has three rack inlets (41') at such positions correspoding to the driven wheels (13'), the output wheel (14') and the rack guide wheels (12') respectively to provide three choices for position of installation of the present invention to meet the need of space requirement in different dies.

As shown in FIG. 7, the transmission means (2') comprises a first spur gear train (21'), a second spiral gear train (22') and a rotating spiral gear (23') arranged in vertical position. A two-row ball bearing (52) is installed between the front gear (211') of the first spur gear train (21') and the output wheel (14') of the power guide means (1'), and another two-row ball bearing (52) is installed between the gear trains (21') and (22') to transmit power to the rotating spiral gear (23'). The second spiral gear train (22') is engaged horizontally so that the tapping unit (30) of the tapping means (3) are installed with its shaft arranged vertically. Therefore, the transmission means (2') of this embodiment is different from that in the embodiment shown in FIGS. 1 and 2, the same transmission and control on number of rotation of the rotating spiral gear (23 and 23') can be achieved by setting of gear ratio.

Except the different in direction of the tapping means (3), the structure of the embodiment shown in FIGS. 6, 7 and 8 is same with that illustrated in FIGS. 1, 2, 4 and 5.

I claim:

1. A device for tapping within die, comprising
a power guide means composed of a rack, at least a rack guide wheel, at least a driven wheel driven by the rack, an output wheel engaging with the driven wheel, and at least a rack inlet at a casing;
a transmission means composed of at least a gear train to set gear ratio, and a rotating spiral gear with a threaded hole, in which the gear train has a front gear to receive power from the output wheel of said power guide means and then transmit via the gear train to the rotating spiral gear and
a tapping means composed of a tapping unit, a guide spiral sleeve, a positioning sleeve and a resistance element, in which the tapping unit is engaged with the rotating spiral gear of said transmission means, rotated upon driving of the rotating spiral gear, and displaced axially upon action of the guide spiral sleeve and the resistance element for tapping purpose.

2. A device for tapping within die as claimed in claim 1 wherein the gear train in the transmission means includes a first spur gear and a second spiral gear train arranged in a way that the second spiral gear train is engaged horizontally so that the axis of the tapping unit of the tapping means is placed vertically.

3. A device for tapping within die as claimed in claim 1 wherein the gear train in the transmission means includes a first bevel gear train and a second spiral gear train arranged in a way that the second spiral gear train is engaged vertically so that the axis of the tapping unit of the tapping means is placed horizontally.

4. A device for tapping within die as claimed in claim 1 wherein the tapping unit in the tapping means comprising
a tapping drill and a tapping chuck, with an outer thread on an end of the tapping chuck;
a guide spiral element with a threaded hole along its axis for holding of the tapping drill, an outer thread on its circumference for engaging with the threaded hole of the rotating spiral gear; and
a fixing nut with a threaded hole for engaging with the guide spiral element and locking in the rotating spiral gear so that the rotating spiral gear and the tapping unit are rotating simultaneously.

5. A device for tapping within die as claimed in claim 1 wherein the guide spiral sleeve of the tapping means has a threaded hole to engage with the guide spiral element, the guide spiral sleeve is placed within a positioning sleeve with a resistance element between them so that a frictional resistance provided by the resistance element can cause the guide spiral element to displace axially along the threaded hole of the guide spiral sleeve when no tapping is done, and tapping process can drive the guide spiral sleeve to rotate by overcoming the frictional resistance of the resistance element.

* * * * *